United States Patent
Huang et al.

(10) Patent No.: US 12,099,738 B2
(45) Date of Patent: Sep. 24, 2024

(54) METHOD AND APPARATUS FOR ADAPTIVELY MANAGING DATA DISK CAPACITY, ELECTRONIC DEVICE, AND STORAGE MEDIUM

(71) Applicant: RUIJIE NETWORKS CO., LTD., Fujian (CN)

(72) Inventors: Qingxin Huang, Fujian (CN); Tengbin Luo, Fujian (CN); Guiyuan Liu, Fujian (CN)

(73) Assignee: RUIJIE NETWORKS CO., LTD., Fujian (CN)

(*) Notice: Subject to any disclaimer, the term of this patent is extended or adjusted under 35 U.S.C. 154(b) by 0 days.

(21) Appl. No.: 18/620,935

(22) Filed: Mar. 28, 2024

(65) Prior Publication Data
US 2024/0241659 A1 Jul. 18, 2024

Related U.S. Application Data

(63) Continuation of application No. PCT/CN2023/107760, filed on Jul. 17, 2023.

(30) Foreign Application Priority Data

Jul. 15, 2022 (CN) .......................... 202210831434.0

(51) Int. Cl.
G06F 3/06 (2006.01)
(52) U.S. Cl.
CPC .......... *G06F 3/0644* (2013.01); *G06F 3/0604* (2013.01); *G06F 3/0683* (2013.01)

(58) Field of Classification Search
CPC ............................ G06F 3/0644; G06F 3/0683
See application file for complete search history.

(56) References Cited

U.S. PATENT DOCUMENTS

| | | | |
|---|---|---|---|
| 9,779,015 B1* | 10/2017 | Oikarinen | G06F 12/02 |
| 10,810,054 B1* | 10/2020 | Martinez Lerin | G06F 3/067 |
| 2019/0050353 A1* | 2/2019 | Xu | G06F 3/0658 |
| 2019/0317817 A1 | 10/2019 | Brown et al. | |

(Continued)

FOREIGN PATENT DOCUMENTS

| | | |
|---|---|---|
| CN | 103605484 | 2/2014 |
| CN | 106933496 | 7/2017 |
| CN | 110399102 | 11/2019 |

(Continued)

OTHER PUBLICATIONS

"International Search Report (Form PCT/ISA/210) of PCT/CN2023/107760," mailed on Oct. 7, 2023, with English translation thereof, pp. 1-6.

*Primary Examiner* — David Yi
*Assistant Examiner* — Nicholas A. Paperno
(74) *Attorney, Agent, or Firm* — JCIPRNET

(57) ABSTRACT

A method for adaptively managing data disk capacity can automatically adjust an available capacity of a group of data disks based on a capacity value of a data disk whose capacity is the smallest in the group of data disks and a capacity difference threshold. In the method, the available capacity of the group of data disks may be automatically adjusted based on the new capacity of the smallest capacity disk, in response to the capacity of the smallest capacity disk in the group of data disks is changed.

17 Claims, 11 Drawing Sheets

(56) References Cited

U.S. PATENT DOCUMENTS

2021/0326052 A1* 10/2021 Singh ................... G06F 3/0617
2023/0325082 A1* 10/2023 Lin ...................... G06F 3/0647

FOREIGN PATENT DOCUMENTS

| CN | 110554947 | 12/2019 |
| CN | 111208952 | 5/2020 |
| CN | 111475407 | 7/2020 |
| CN | 111857592 | 10/2020 |
| CN | 113282241 | 8/2021 |

\* cited by examiner

METHOD AND APPARATUS FOR ADAPTIVELY MANAGING DATA DISK CAPACITY, ELECTRONIC DEVICE, AND STORAGE MEDIUM

CROSS-REFERENCE TO RELATED APPLICATIONS

This application is a continuation of International Patent Application No. PCT/CN2023/107760 filed on Jul. 17, 2023, which claims priority to Chinese Patent Application No. 202210831434.0, filed with the China National Intellectual Property Administration on Jul. 15, 2022 and entitled "METHOD AND APPARATUS FOR MANAGING DATA DISK CAPACITY, ELECTRONIC DEVICE, AND STORAGE MEDIUM", both of which are incorporated herein by reference in their entireties.

BACKGROUND

Technical Field

This application relates to the field of storage technologies, and in particular, to a method for adaptively managing a data disk capacity, an electronic device, and a storage medium.

With fast development of cloud computing, big data, and other technologies, there is an explosive growth of data. As a result, demand for storage space is increasing, and performance of storage devices is increasingly high to meet practical requirements of data storage. A conventional storage system uses a centralized storage server to store all data. The storage server has become a bottleneck of system performance. There are also risks in reliability, security, and the like. Therefore, requirements of massive data storage cannot be met. A current storage system is developing toward a massive, distributed, and virtualized system.

A distributed storage system organizes discrete disk space distributed on a plurality of server nodes into logically continuous large storage space by using software or other methods. The plurality of storage servers cooperate with each other to present a unified single view of virtual space to a user. Each independent device in the distributed storage system is referred to as a storage node. The distributed storage system uses a scalable structure, and can use a plurality of memories to bear storage tasks, and use a location server to locate storage information. This not only can improve reliability and access efficiency of the system, but also is readily scalable.

SUMMARY

Exemplary embodiments of this application provide a method for adaptively managing a data disk capacity. The method for adaptively managing a data disk capacity includes the following steps: determining whether a capacity difference threshold of a group of data disks or a capacity of a smallest capacity disk is changed; and if the capacity difference threshold of the group of data disks and the capacity of the smallest capacity disk are not changed, not adjusting an available capacity of each data disk; or if the capacity difference threshold of the group of data disks or the capacity of the smallest capacity disk is changed, performing the following steps: obtaining a current capacity difference threshold and a capacity of a current smallest capacity disk; calculating an available capacity limit based on the current capacity difference threshold and the capacity of the current smallest capacity disk; and adjusting an available capacity of a to-be-adjusted data disk based on the available capacity limit, where the available capacity of the to-be-adjusted data disk does not exceed the available capacity limit.

The method for adaptively managing a data disk capacity according to this application has the following advantages: (1) An available capacity of the group of data disks is automatically adjusted based on a capacity value of a data disk whose capacity is the smallest in the group of data disks and the capacity difference threshold, so that an available capacity difference of each data disk in the group of data disks is within a specified range, thereby avoiding a load imbalance caused by an excessively large capacity difference. (2) When the capacity of the smallest capacity disk in the group of data disks is changed, the available capacity of the group of data disks may be automatically adjusted based on the new capacity of the smallest capacity disk. Flexibility is high. (3) The capacity difference threshold may be adjusted based on different application scenarios and a status of a system. The storage system can automatically adjust the available capacity of the data disk based on the adjusted capacity difference threshold to adapt to different performance-first and capacity-first scenarios and ensure optimal performance of the storage system while meeting a capacity requirement.

In an embodiment, the capacity difference threshold is one of the following: a percentage, a capacity difference, or a weight.

In an embodiment, when the capacity difference threshold is a percentage, Available capacity limit=Capacity of the smallest capacity disk*(1+Capacity difference threshold).

In an embodiment, when the capacity difference threshold is a capacity difference, Available capacity limit=Capacity of the smallest capacity disk+Capacity difference threshold.

In an embodiment, the adjusting the available capacity of the to-be-adjusted data disk based on the available capacity limit includes the following steps: obtaining an actual capacity of the to-be-adjusted data disk; determining a magnitude relationship between the available capacity limit and the actual capacity of the to-be-adjusted data disk; and if the available capacity limit is greater than the actual capacity of the to-be-adjusted data disk, adjusting the available capacity of the to-be-adjusted data disk to the actual capacity of the to-be-adjusted data disk; or if the available capacity limit is less than the actual capacity of the to-be-adjusted data disk, adjusting the available capacity of the to-be-adjusted data disk to the available capacity limit.

In an embodiment, before the adjusting the available capacity of the to-be-adjusted data disk, the method further includes the following steps: determining whether the to-be-adjusted data disk meets an available capacity adjustment condition; and if the to-be-adjusted data disk meets the available capacity adjustment condition, adjusting the available capacity of the to-be-adjusted data disk; otherwise, skipping adjusting the available capacity of the to-be-adjusted data disk. Security of data that has been stored can be better ensured by determining whether the to-be-adjusted data disk meets the available capacity adjustment condition.

In an embodiment, the available capacity adjustment condition is: when the actual capacity of the to-be-adjusted data disk exceeds the available capacity limit, storage space beyond the available capacity limit is unused.

In an embodiment, the method for adaptively managing a data disk capacity further includes the following step: outputting at least one of the following parameters: a remaining available capacity, usage, and a data disk status.

In an embodiment, the remaining available capacity is calculated by using the following steps: determining whether the available capacity of the data disk after the adjustment is greater than the available capacity of the data disk before the adjustment; and if the available capacity after the adjustment is greater than the available capacity before the adjustment, determining that a current remaining available capacity of the data disk is a remaining available capacity before the adjustment plus a difference between the available capacity after the adjustment and the available capacity before the adjustment; or if the available capacity after the adjustment is less than the available capacity before the adjustment, determining that a current remaining available capacity of the data disk is a remaining available capacity before the adjustment minus a difference between the available capacity after the adjustment and the available capacity before the adjustment.

According to another aspect of this application, an apparatus for adaptively managing a data disk capacity is provided. The apparatus for adaptively managing a data disk capacity includes a smallest capacity obtaining unit, a capacity difference threshold adjustment unit, an available capacity limit obtaining unit, and an available capacity adjustment unit. The smallest capacity obtaining unit is configured to obtain a capacity of a current smallest capacity disk in a group of data disks, compare the capacity of the current smallest capacity disk with a previously recorded capacity of the smallest capacity disk, and if the two are not equal, trigger an adjustment of an available capacity of a data disk. The capacity difference threshold adjustment unit is configured to adjust a capacity difference threshold, and when the capacity difference threshold adjustment unit adjusts the capacity difference threshold, trigger the adjustment of the available capacity of the data disk. The available capacity limit obtaining unit is configured to calculate an available capacity limit based on a capacity value of the current smallest capacity disk and the capacity difference threshold when the adjustment of the available capacity of the data disk is triggered. The available capacity adjustment unit is configured to adjust an available capacity of a to-be-adjusted data disk based on the available capacity limit, where the available capacity of the to-be-adjusted data disk does not exceed the available capacity limit.

The apparatus for adaptively managing a data disk capacity in this application has the following advantages: (1) The smallest capacity obtaining unit and the capacity difference threshold adjustment unit can detect in real time whether the smallest capacity disk and the capacity difference threshold of the group of data disks are changed. If the smallest capacity disk or the capacity difference threshold is changed, the available capacity adjustment unit automatically adjusts an available capacity of the group of data disks based on the current capacity value of the smallest capacity disk and the capacity difference threshold, so that an available capacity difference of each data disk in the group of data disks is within a specified range, thereby avoiding a load imbalance caused by an excessively large capacity difference. In addition, because the adjustment can be automatically performed, flexibility is high. (2) The capacity difference threshold adjustment unit can adjust the capacity difference threshold based on different application scenarios and a status of a system. The storage system can automatically adjust the available capacity of the data disk based on the adjusted capacity difference threshold to adapt to different performance-first and capacity-first scenarios and ensure optimal performance of the storage system while meeting a capacity requirement.

In an embodiment, the apparatus for adaptively managing a data disk capacity further includes an adjustment condition determining unit, configured to determine whether the to-be-adjusted data disk meets an adjustment condition, and if the to-be-adjusted data disk meets the adjustment condition, adjust the available capacity of the to-be-adjusted data disk; otherwise, skip adjusting the available capacity of the to-be-adjusted data disk.

In an embodiment, the adjustment condition is: when an actual capacity of the to-be-adjusted data disk exceeds the available capacity limit, storage space beyond the available capacity limit is unused.

In an embodiment, the available capacity adjustment unit is specifically configured to: obtain the actual capacity of the to-be-adjusted data disk; determine a magnitude relationship between the available capacity limit and the actual capacity of the to-be-adjusted data disk; and if the available capacity limit is greater than the actual capacity of the to-be-adjusted data disk, adjust the available capacity of the to-be-adjusted data disk to the actual capacity of the to-be-adjusted data disk; or if the available capacity limit is less than the actual capacity of the to-be-adjusted data disk, adjust the available capacity of the to-be-adjusted data disk to the available capacity limit.

In an embodiment, the available capacity adjustment unit is further configured to output at least one of the following parameters: a remaining available capacity, usage, and a data disk status.

In an embodiment, when outputting the remaining available capacity, the available capacity adjustment unit is specifically configured to: determine whether the available capacity of the data disk after the adjustment is greater than the available capacity of the data disk before the adjustment; and if the available capacity after the adjustment is greater than the available capacity before the adjustment, determine that a current remaining available capacity of the data disk is a remaining available capacity before the adjustment plus a difference between the available capacity after the adjustment and the available capacity before the adjustment; or if the available capacity after the adjustment is less than the available capacity before the adjustment, determine that a current remaining available capacity of the data disk is a remaining available capacity before the adjustment minus a difference between the available capacity after the adjustment and the available capacity before the adjustment.

According to still another aspect of this application, a method for adaptively managing a data disk capacity is provided and includes:

when at least one of a capacity difference threshold of a first group of data disks and a capacity of a smallest capacity disk is changed, obtaining a current capacity difference threshold of the first group of data disks and a capacity of a current smallest capacity disk, where the smallest capacity disk is one data disk in the first group of data disks; calculating an available capacity limit based on the current capacity difference threshold of the first group of data disks and the capacity of the current smallest capacity disk; and adjusting an available capacity of a to-be-adjusted data disk in the first group of data disks based on the available capacity limit, so that an available capacity of the adjusted data disk is less than or equal to the available capacity limit.

In an embodiment of this application, an available capacity of the group of data disks is automatically adjusted based on a capacity value of a data disk whose capacity is smallest in the group of data disks and the capacity difference threshold, so that an available capacity difference of each data disk in the group of data disks is within a specified range, thereby avoiding a load imbalance caused by an excessively large capacity difference.

In this embodiment, a distributed storage system may include only the first group of data disks, and may further include other groups of data disks than the first group of data disks.

In this embodiment, the smallest capacity disk may be determined based on real-time detection of a capacity of a data disk in the first group of data disks, or may be determined based on an indication of the smallest capacity disk.

In an embodiment, the adjusting the available capacity of the to-be-adjusted data disk in the first group of data disks based on the available capacity limit includes:
  obtaining an actual capacity of the to-be-adjusted data disk; and
  determining a magnitude relationship between the available capacity limit and the actual capacity of the to-be-adjusted data disk, and if the available capacity limit is less than the actual capacity of the to-be-adjusted data disk, adjusting the available capacity of the to-be-adjusted data disk to the available capacity limit.

In an embodiment, before the at least one of the capacity difference threshold of the first group of data disks and the capacity of the smallest capacity disk is changed, the method further includes:
  increasing the capacity difference threshold in response to a total available capacity of the first group of data disks being less than or equal to a first capacity threshold.

In an embodiment, before the at least one of the capacity difference threshold of the first group of data disks and the capacity of the smallest capacity disk is changed, the method further includes:
  reducing the capacity difference threshold in response to a total available capacity of the first group of data disks being greater than or equal to a second capacity threshold.

In an embodiment, the determining the magnitude relationship between the available capacity limit and the actual capacity of the to-be-adjusted data disk further includes:
  if the available capacity limit is greater than or equal to the actual capacity of the to-be-adjusted data disk, adjusting the available capacity of the to-be-adjusted data disk to the actual capacity of the to-be-adjusted data disk.

In an embodiment, the capacity difference threshold includes a first capacity difference threshold and a second capacity difference threshold, a type of the to-be-adjusted data disk includes a first data disk type and a second data disk type, and the available capacity limit includes a first available capacity limit and a second available capacity limit, where the second capacity difference threshold is greater than the first capacity difference threshold; and
  the calculating an available capacity limit based on the current capacity difference threshold and the capacity of the current smallest capacity disk, and adjusting an available capacity of a to-be-adjusted data disk based on the available capacity limit, so that an available capacity of the adjusted data disk is less than or equal to the available capacity limit includes:
  calculating the first available capacity limit based on the current first capacity difference threshold and the capacity of the current smallest capacity disk;
  adjusting the available capacity of the to-be-adjusted data disk of the first data disk type based on the first available capacity limit, so that the available capacity of the adjusted data disk of the first data disk type is less than or equal to the first available capacity limit;
  calculating the second available capacity limit based on the current second capacity difference threshold and the capacity of the current smallest capacity disk; and
  adjusting the available capacity of the to-be-adjusted data disk of the second data disk type based on the second available capacity limit, so that the available capacity of the adjusted data disk of the second data disk type is less than or equal to the second available capacity limit.

In an embodiment, before the adjusting the available capacity of the to-be-adjusted data disk in the first group of data disks based on the available capacity limit, the method further includes:
  determining whether the to-be-adjusted data disk meets an available capacity adjustment condition, and if the to-be-adjusted data disk meets the available capacity adjustment condition, allowing adjusting the available capacity of the to-be-adjusted data disk.

In an embodiment, the available capacity adjustment condition includes that:
  an actual capacity of the to-be-adjusted data disk is greater than the available capacity limit, and storage space of the actual capacity of the to-be-adjusted data disk beyond the available capacity limit is unused.

In an embodiment, the method further includes:
  determining whether the available capacity of the adjusted data disk is greater than the available capacity of the to-be-adjusted data disk, and if the available capacity of the adjusted data disk is greater than the available capacity of the to-be-adjusted data disk, a remaining available capacity of the adjusted data disk is a remaining available capacity of the to-be-adjusted data disk plus a difference between the available capacity of the adjusted data disk and the available capacity of the to-be-adjusted data disk.

In an embodiment, the determining whether the available capacity of the adjusted data disk is greater than the available capacity of the to-be-adjusted data disk further includes:
  if the available capacity of the adjusted data disk is less than the available capacity of the to-be-adjusted data disk, the remaining available capacity of the adjusted data disk is the remaining available capacity of the to-be-adjusted data disk minus the difference between the available capacity of the adjusted data disk and the available capacity of the to-be-adjusted data disk.

In an embodiment, each data disk in the first group of data disks is provided with storage space as hot spare space.

In an embodiment, the first group of data disks refers to all data disks in a storage pool, all data disks in a node of a storage pool, or all data disks at a performance tier in a node of a storage pool.

According to yet another aspect of this application, an apparatus for adaptively managing a data disk capacity is provided and includes:
  a threshold and capacity obtaining unit, configured to obtain a current capacity difference threshold of a first group of data disks and a current capacity of a smallest capacity disk when at least one of a capacity difference threshold of the first group of data disks and a capacity of the smallest capacity disk is changed, where the smallest capacity disk is one data disk in the first group of data disks;
  an available capacity limit calculation unit, configured to calculate an available capacity limit based on the current capacity difference threshold of the first group of data disks and the capacity of the current smallest capacity disk; and an available capacity adjustment unit, configured to adjust an available capacity of a to-be-adjusted data disk in the first group of data disks based on the available capacity limit, so that an available capacity of the adjusted data disk is less than or equal to the available capacity limit.

According to yet another aspect of this application, a method for adaptively managing a data disk capacity is provided and includes:

when a capacity difference threshold of a first group of data disks is changed, obtaining a current capacity difference threshold of the first group of data disks; calculating an available capacity limit based on the current capacity difference threshold of the first group of data disks and a capacity of a smallest capacity disk; and adjusting an available capacity of a to-be-adjusted data disk in the first group of data disks based on the available capacity limit, so that an available capacity of the adjusted data disk is less than or equal to the available capacity limit.

According to one aspect of this application, a method for adaptively managing a data disk capacity is provided and includes:

when a capacity of a smallest capacity disk is changed, obtaining a capacity difference threshold of a first group of data disks and a capacity of a current smallest capacity disk, where the smallest capacity disk is one data disk in the first group of data disks; calculating an available capacity limit based on the capacity difference threshold of the first group of data disks and the capacity of the current smallest capacity disk; and adjusting an available capacity of a to-be-adjusted data disk in the first group of data disks based on the available capacity limit, so that an available capacity of the adjusted data disk is less than or equal to the available capacity limit.

According to another aspect of this application, an electronic device is further provided and includes a memory and a processor. The memory is configured to store program code to be used during running of the electronic device. The processor is configured to execute the program code to implement a method for adaptively managing a data disk capacity.

According to another aspect of this application, a non-volatile storage medium is further provided. When instructions in the storage medium are executed by a processor of an electronic device, the electronic device is enabled to perform a method for adaptively managing a data disk capacity.

DESCRIPTION OF THE EMBODIMENTS

Figure 1:
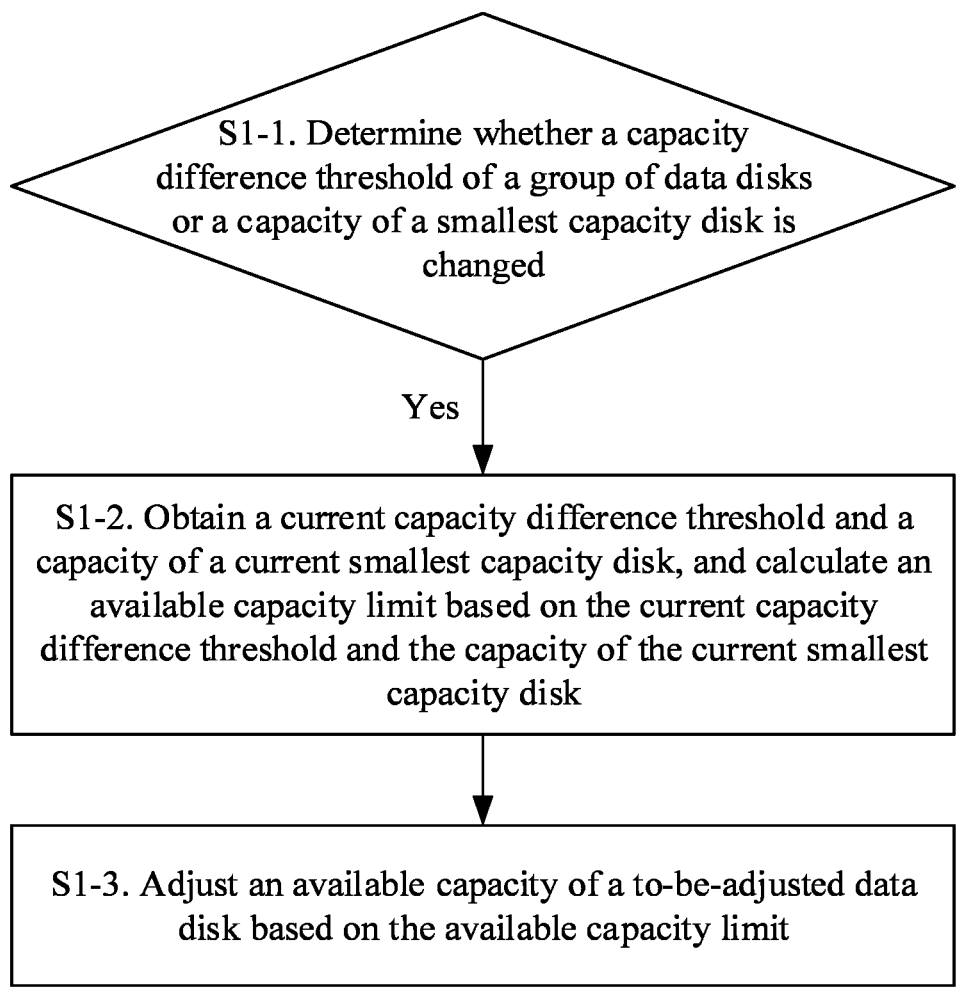
FIG. 1 is a flowchart of a method for managing a data disk capacity according to an embodiment of this application.

A distributed storage system generally requires that hardware configurations of server nodes in a cluster should be consistent, to fully use a storage capacity and achieve better storage performance. However, in some application scenarios, because an enterprise purchases storage hardware resources of different brands and models such as servers and data disks (HDDs, SSDs, and other storage resources in general, where "hard disk" and "data disk" are not distinguished in this application, and "hard disk" is used instead of "data disk" in some of the following descriptions) in different phases of informatization construction, there are more or less differences in storage hardware.

With continuous development of hard disk manufacturing technologies, a capacity of a single disk is continuously increased. As a result, the storage system inevitably faces a problem of hard disk capacity heterogeneity during capacity expansion and component replacement. However, an existing storage solution cannot cope with disk capacity heterogeneity well, which affects use experience of storage products. In addition, as large-capacity disks bear a heavier burden, a failure probability of the large-capacity disks increases, resulting in great data security risks.

Therefore, a method for managing a data disk capacity is urgently needed to resolve impact on storage performance and data security risks arising from a load imbalance caused by an excessively large capacity difference between hard disks.

To reduce impact of capacity disk heterogeneity on storage performance and data security risks, known technologies mainly include the following solutions: (1) Changing physical configurations: Physical capacities of hard disks are changed by changing hardware configurations directly, so that capacities of the disks are consistent. This solution is an offline adjustment mode, featuring a complicated process and poor flexibility because each setting and change need to be performed offline. (2) Configuring weights by means of software configurations: By means of software configurations, different weights are assigned to different storage resources based on requirements. It is ensured that a hard disk with a higher weight is more likely to be selected, that is, a probability that this hard disk is used is higher. In this way, heterogeneous storage resources are effectively controlled, as in Ceph distributed storage. However, a problem with this method is that because the hard disk with the higher weight is more likely to be used, a failure probability of the hard disk increases. Consequently, data security of the entire storage system may be affected. Therefore, for distributed storage, and in particular, for heterogeneous distributed storage, currently, there is no good management method that can enable the heterogeneous distributed storage system to have both flexibility and security.

Exemplary embodiments of this application provide a method for adaptively managing a data disk capacity. In the method for managing a data disk capacity, available capacities of other data disks are automatically adjusted based on a data disk whose capacity is the smallest in a group of data disks and a capacity difference threshold, so that an available capacity difference of each data disk in the group is within a specified range, thereby avoiding a load imbalance caused by an excessively large capacity difference. In addition, because the available capacities of the other data disks can be automatically adjusted based on the smallest capacity disk or the capacity difference threshold in this method, no manual intervention is required in this method, and flexibility is high.

FIG. 1 is a flowchart of a method for managing a data disk capacity according to an embodiment of this application. The method for managing a data disk capacity may include the following steps.

Step S1-1: Determine whether a capacity difference threshold of a group of data disks or a capacity of a smallest capacity disk is changed; and if the capacity difference threshold of the group of data disks and the capacity of the smallest capacity disk are not changed, do not adjust an available capacity of each data disk; or if the capacity difference threshold of the group of data disks or the capacity of the smallest capacity disk is changed, perform Step S1-2.

In this embodiment, the group of data disks may be all data disks in a storage pool, all data disks in a node of a storage pool, or data disks at a performance tier in a storage pool, all of which may be adjusted according to the method in this application. The group of data disks is not limited herein. A storage pool is a storage resource pool formed by aggregating a group of data disks. The storage pool may include a plurality of nodes, data disks in each node may be classified into a plurality of different performance tiers, and each performance tier may include a group of data disks. During classification of storage nodes, data disks with similar performance in a storage node may be classified into the same performance tier based on performance differences of the data disks. For example, if a storage node includes two types of data disks: mechanical hard disks (English: Hard Disk Drive, HDD for short) and solid state disks (English: Solid State Drive, SSD for short), all the HDDs may be classified into one performance tier, and all the SSDs may be classified into another performance tier.

The capacity difference threshold is used to limit a difference between a capacity of each data disk in the group of data disks and that of the smallest capacity disk in the group of data disks. A type of the capacity difference threshold is not limited in this application. To be specific, the capacity difference threshold may be a percentage, a capacity difference, a weight, or the like.

When the capacity difference threshold is a percentage, it indicates that the available capacity of each data disk in the group of data disks is greater than the capacity of the smallest capacity disk by the capacity difference threshold at most. For example, when the capacity difference threshold is set to 20%, it indicates that the available capacity of each data disk is at most 20% greater than the capacity of the smallest capacity disk. When the capacity difference threshold is set to 0%, it indicates that the available capacity of each data disk should be equal to the capacity of the smallest capacity disk.

When the capacity difference threshold is a capacity difference, it indicates that a capacity difference between the available capacity of each data disk in the group of data disks and the capacity of the smallest capacity disk in the group of data disks does not exceed the capacity difference threshold. For example, when the capacity difference threshold is set to 100 GB, it indicates that the capacity difference between the available capacity of each data disk and the capacity of the smallest capacity disk does not exceed 100 GB.

The capacity difference threshold may be manually set based on different application scenarios. For example, in an environment with heterogeneous data disk capacities, the capacity difference threshold may be set to 0% in an early phase of using the storage system, to ensure that the available capacity of each data disk is consistent, thereby avoiding a load imbalance and improving service performance of the storage system. In a late phase of using the storage system, because the available capacity is nearly exhausted and no additional data disk is available for capacity expansion, a priority of the available capacity of the system is higher than a priority of performance. In this case, a user can increase the capacity difference threshold to release some previously limited capacities of large capacity disks and increase the available capacity of the storage system.

The capacity difference threshold may be adjusted based on requirements of different application scenarios. Adjusting the difference between various data disks by adjusting the capacity difference threshold can not only avoid a load imbalance caused by an excessively large capacity difference and impact thereof on service performance of the storage system, but also release the capacities of the large capacity disks and fully use a bandwidth of each data disk when capacity expansion is required. In this way, both performance and capacity requirements can be taken into account, and performance of the storage system can be improved as much as possible while the capacity requirements are met.

Alternatively, the capacity difference threshold may be adjusted automatically and dynamically based on a current remaining available capacity. For example, in the early phase of using the storage system, because the remaining available capacity is large, a value of the capacity difference threshold can be set to a small value. When the remaining available capacity is lower than a level, the capacity difference threshold is increased, so that some limited capacities of the large capacity disks are released to meet storage capacity requirements. When the remaining available capacity is higher than a level, the capacity difference threshold is reduced to release some capacities of the large capacity disks to avoid a load imbalance among the data disks and improve performance of the storage system.

The capacity difference threshold may include a plurality of different values, which may be set for different data disks respectively. For example, if the data disks in the storage pool include both HDD and SSD data disks, and all of the data disks need to be adjusted, a first capacity difference threshold and a second capacity difference threshold may be set. The first capacity difference threshold is used to adjust the HDD data disks. The second capacity difference threshold is used to adjust the SSD data disks. A special capacity difference threshold may also be set for a special data disk in the storage system. For example, if a capacity and performance of a data disk in the system are better than those of other data disks, a first capacity difference threshold and a second capacity difference threshold may be set, where the first capacity difference threshold is used to adjust the capacities of the other data disks, the second capacity difference threshold is used to adjust the capacity of the special data disk, and the second capacity difference threshold is greater than the first capacity difference threshold. A quantity and types of capacity difference thresholds are not limited herein. The capacity difference thresholds may be set and adjusted based on different systems and application scenarios. A capacity difference between each data disk in the group of storage disks and the smallest capacity disk is dynamically adjusted by setting different capacity difference thresholds in different application scenarios. In this way, it can be ensured that performance of the storage system is improved as much as possible while capacity requirements of the storage system are met.

Step S1-2: Obtain a current capacity difference threshold and a capacity of a current smallest capacity disk, and calculate an available capacity limit based on the current capacity difference threshold and the capacity of the current smallest capacity disk.

The available capacity limit indicates that the available capacity of each data disk in the group of data disks cannot exceed the available capacity limit.

Specifically, if the capacity difference threshold is a percentage, Available capacity limit=Capacity of the smallest capacity disk*(1+Capacity difference threshold). If the capacity difference threshold is a capacity difference, Available capacity limit=Capacity of the smallest capacity disk+ Capacity difference threshold. Setting the available capacity limit can ensure that the capacity difference between each data disk and the smallest capacity disk in the group of data disks is within a specified range, and avoid a load imbalance caused by an excessively large capacity difference.

Step S1-3: Adjust an available capacity of a to-be-adjusted data disk based on the available capacity limit.

Figure 2:
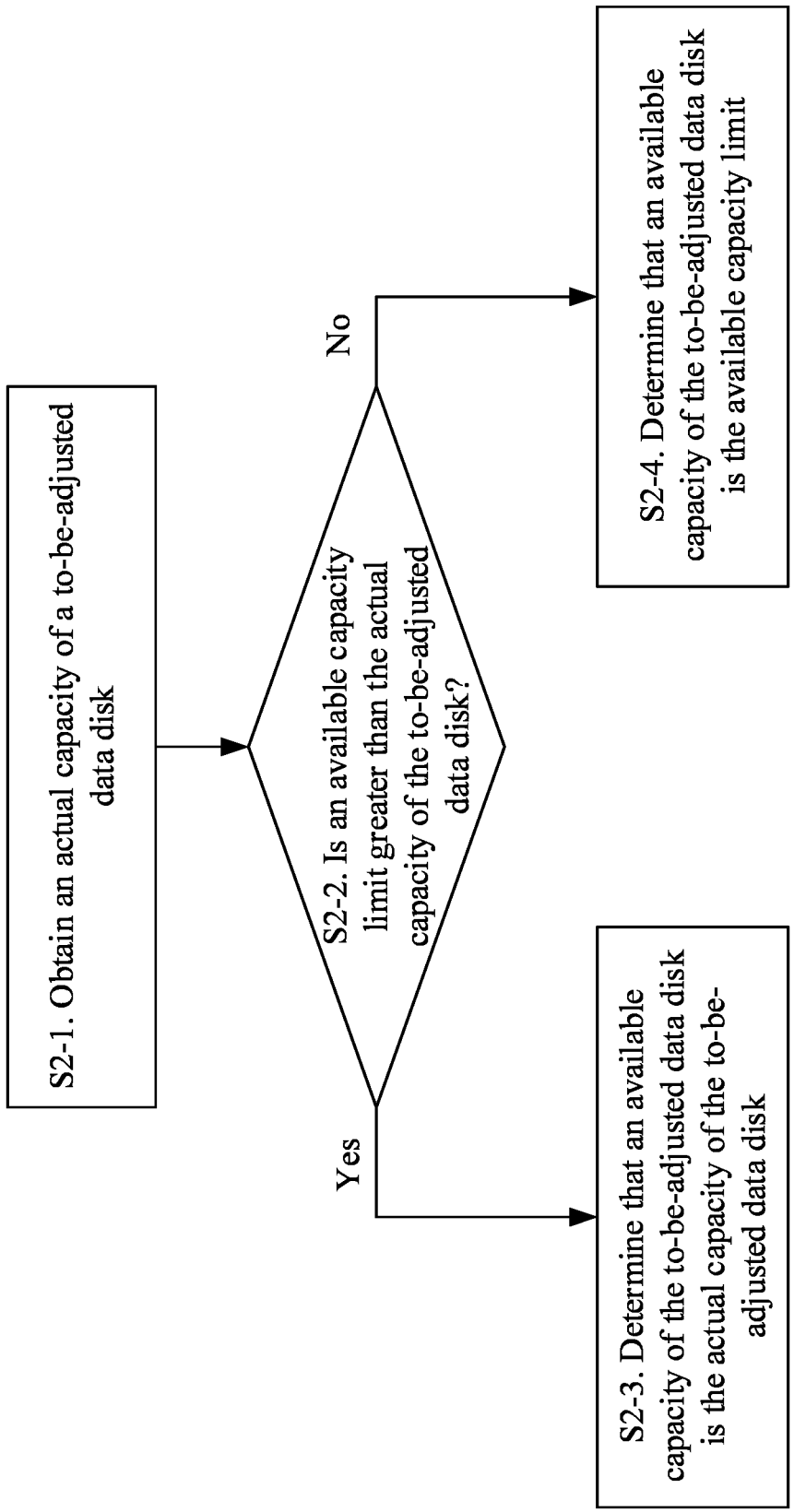
FIG. 2 is a flowchart for adjusting an available capacity of a to-be-adjusted data disk according to an embodiment of this application.

Specifically, FIG. 2 is a flowchart for adjusting the available capacity of the to-be-adjusted data disk. Adjusting the available capacity of the to-be-adjusted data disk may include the following steps.

Step S2-1: Obtain an actual capacity of the to-be-adjusted data disk.

Step S2-2: Determine a magnitude relationship between the available capacity limit and the actual capacity of the to-be-adjusted data disk; and if the available capacity limit is greater than the actual capacity of the to-be-adjusted data disk, perform Step S2-3; or if the available capacity limit is less than or equal to the actual capacity of the to-be-adjusted data disk, perform Step S2-4.

Step S2-3: Determine that the actual capacity of the to-be-adjusted data disk is the available capacity of the to-be-adjusted data disk.

Step S2-4: Determine that the available capacity limit is the available capacity of the to-be-adjusted data disk.

Therefore, after the adjustment in Step S2-4, the available capacity of each data disk in the group of data disks does not exceed the available capacity limit.

Figure 3:
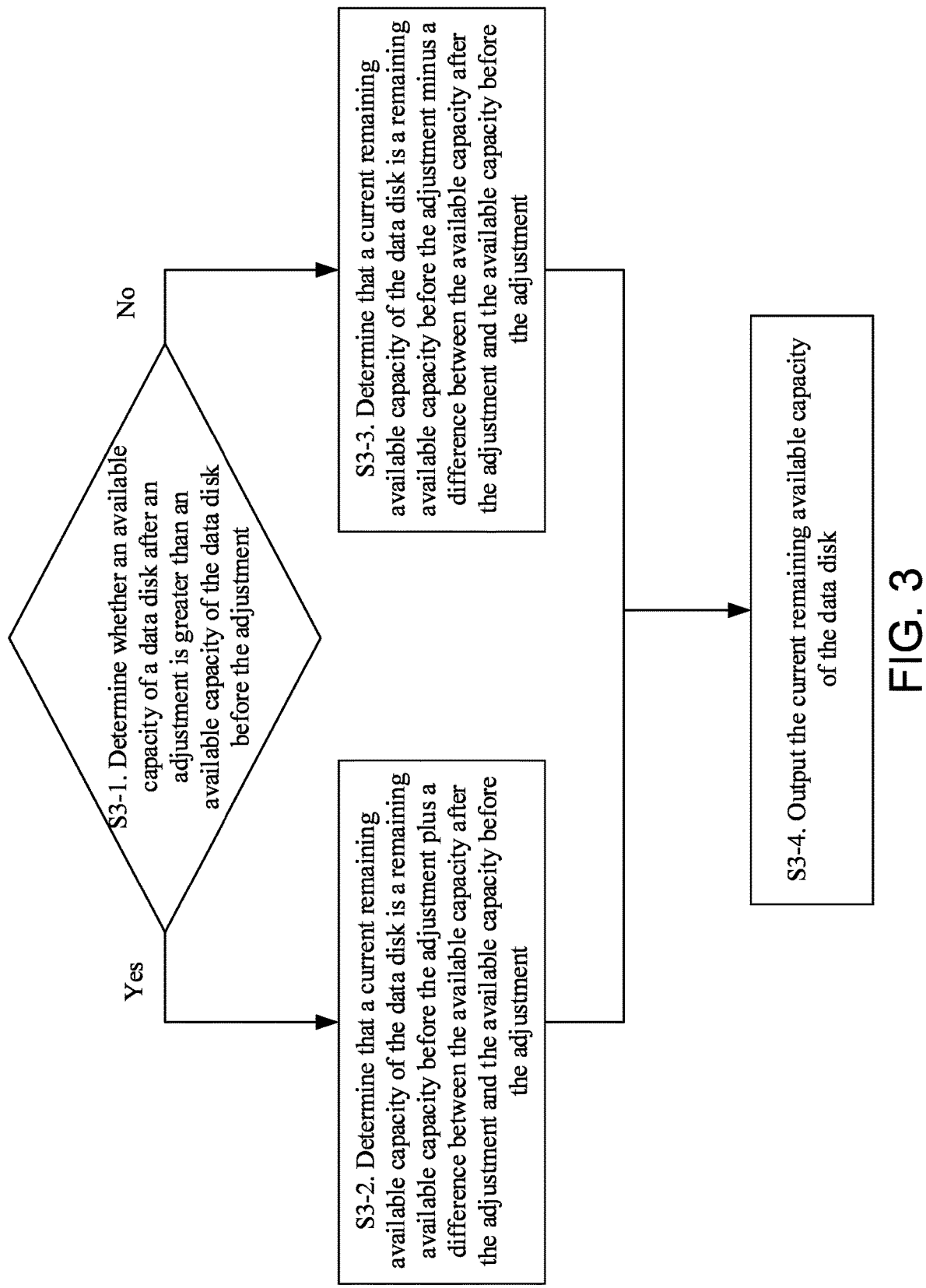
FIG. 3 is a flowchart for adjusting a remaining available capacity of a data disk according to an embodiment of this application.

To better record information in each data disk, after the available capacity of the to-be-adjusted data disk is adjusted, if the available capacity of the data disk is changed, parameters (remaining available capacity, usage, data disk status, and the like) related to the data disk should also be adjusted correspondingly. FIG. 3 is a flowchart for adjusting the remaining available capacity of the data disk. Adjusting the remaining available capacity of the data disk includes the following steps.

Step S3-1: Determine whether the available capacity of the data disk after the adjustment is greater than the available capacity of the data disk before the adjustment; and if the available capacity after the adjustment is greater than the available capacity before the adjustment, perform Step S3-2; or if the available capacity after the adjustment is less than the available capacity before the adjustment, perform Step S3-3.

Step S3-2: Determine that a current remaining available capacity of the data disk is a remaining available capacity before the adjustment plus a difference between the available capacity after the adjustment and the available capacity before the adjustment.

Step S3-3: Determine that a current remaining available capacity of the data disk is a remaining available capacity before the adjustment minus a difference between the available capacity after the adjustment and the available capacity before the adjustment.

Step S3-4: Output the current remaining available capacity of the data disk.

The remaining available capacity of the entire storage system may be obtained based on a current remaining available capacity of each data disk, and the capacity difference threshold may be adjusted based on this parameter. Usage of each data disk may be obtained based on the current remaining available capacity of each data disk. In this way, the status of each data disk in the storage system can be better learned.

In an embodiment, depending on configurations, some storage space is reserved in each data disk as hot spare space. When the available capacity of the data disk is changed, the capacity used as hot spare space and a remaining available hot spare capacity of the data disk should be adjusted correspondingly.

In an embodiment in which data disks in the group are data disks at a same performance tier, when the available capacity of the group of data disks is adjusted, it is also possible to adjust capacities and related parameters of nodes in which the data disks in the group are located, and capacities and related parameters of the storage pool in which the data disks in the group are located.

To better ensure security of original data in the data disk during the data disk adjustment, in an embodiment, before adjusting the available capacity of the to-be-adjusted data disk, the method further includes: determining whether the to-be-adjusted data disk meets an available capacity adjustment condition, and adjusting the available capacity of the data disk meeting the condition. In an implementation, the adjustment is performed only after it is determined that all data disks in the group of data disks meet the adjustment condition. In another implementation, whether each data disk in the group of hard disks meets the adjustment condition is determined separately, and a hard disk that meets the adjustment condition is adjusted. Criteria for determining whether the data disk meets the adjustment condition are as follows: If the actual capacity of the to-be-adjusted data disk exceeds the available capacity limit and storage space beyond the available capacity limit is used, the available capacity of the data disk is not allowed to be adjusted, so that security of data stored in the data disk is ensured. If storage space of the data disk beyond the available capacity limit is unused, the available capacity of the data disk is allowed to be adjusted.

Figure 4:
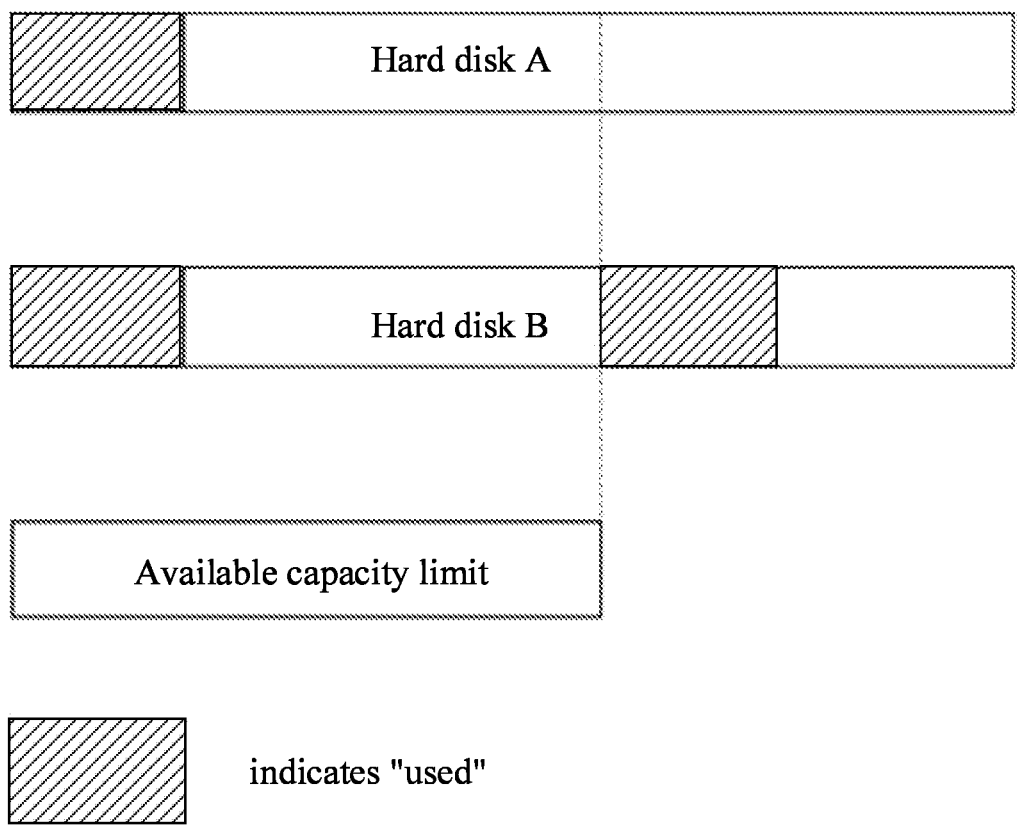
FIG. 4 is a schematic diagram of usage of storage space in two data disks according to an embodiment of this application.

FIG. 4 is a schematic diagram of usage of storage space in two data disks. As can be learned based on the foregoing adjustment criteria, because storage space of data disk A beyond the available capacity limit is unused, data disk A meets the adjustment condition. Because storage space of data disk B beyond the available capacity limit is used, data disk B does not meet the adjustment condition. Specifically, with respect to whether to adjust data disk A or data disk B, because data disk B does not meet the available capacity adjustment condition, an available capacity of data disk B is not adjusted. If a data disk is adjusted as long as the adjustment condition is met, the available capacity of data disk A is adjusted. If the adjustment is performed only after all data disks in the group of data disks meet the adjustment condition, it is further necessary to determine whether all other data disks in the same group as data disk A meet the adjustment condition. Data disk A is adjusted only when all data disks in the group of data disks meet the adjustment condition. By adding criteria for determining whether the to-be-adjusted data disk meets the available capacity adjustment condition and adjusting only the available capacity of the data disk meeting the adjustment condition, security of data in the storage system is enhanced, and reliability of the method for managing a data disk capacity in this application is improved.

The method for managing a data disk capacity according to this application has the following advantages: (1) An available capacity of the group of data disks is automatically adjusted based on a capacity value of a data disk whose capacity is smallest in the group of data disks and the capacity difference threshold, so that an available capacity difference of each data disk in the group of data disks is within a specified range, thereby avoiding a load imbalance caused by an excessively large capacity difference. (2) When the capacity of the smallest capacity disk in the group of data disks is changed, the available capacity of the group of data disks may be automatically adjusted based on the new capacity of the smallest capacity disk. Flexibility is high. (3) The capacity difference threshold may be adjusted based on different application scenarios and a status of the system. The storage system can automatically adjust the available capacity of the data disk based on the adjusted capacity difference threshold to adapt to different performance-first and capacity-first scenarios and ensure optimal performance of the storage system while meeting a capacity requirement.

To better describe the method for managing a data disk capacity in this application, the following provides several embodiments to illustrate an operation process of the method for managing a data disk capacity in this application.

Figure 5:
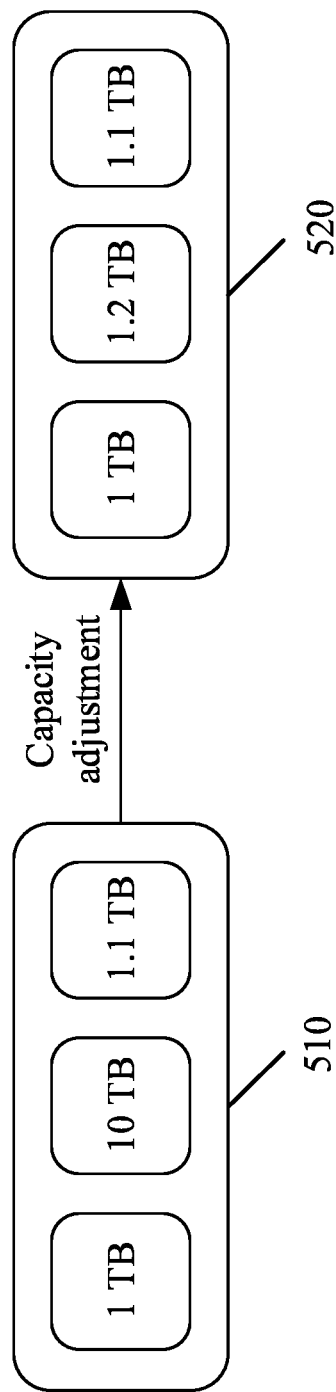
FIG. 5 is a schematic diagram for adjusting an available capacity of a group of data disks according to an embodiment of this application, where a group of data disks 510 includes data disks before available capacities are adjusted, and a group of data disks 520 is obtained after available capacities of the group of data disks 510 are adjusted.

FIG. 5 is a schematic diagram for creating a group of data disks. The data disks in the group may be data disks at a performance tier in a storage pool. A group of data disks 510 includes three data disks. The group of data disks 510 includes three data disks whose capacities are 1 TB, 10 TB, and 1.1 TB respectively. A capacity of a smallest capacity disk is 1 TB. In this embodiment, if a capacity difference threshold is set to 20%, an available capacity limit may be calculated: 1 TB*(1+20%)=1.2 TB. When the group of data disks is created, the three data disks are unused. Therefore, all the data disks can meet an adjustment condition. Actual capacities of two data disks whose capacities are 1 TB and 1.1 TB are both less than the available capacity limit of 1.2 TB. Therefore, available capacities of the two data disks are the actual capacities of the two data disks. For the data disk whose capacity is 10 TB, an actual capacity of the data disk is greater than the available capacity limit. Therefore, an available capacity of the data disk is the available capacity limit of 1.2 TB, that is, the available capacity of the data disk is limited to 1.2 TB.

After the group of data disks 510 is adjusted, a group of data disks 520 is obtained. Available capacities of data disks in the group of data disks 520 are 1 TB, 1.2 TB, and 1.1 TB respectively. As can be learned according to this embodiment, an available capacity difference of each data disk in the group of data disks is limited within 20%. Therefore, a load imbalance and overall performance degradation caused by an excessively large hard disk capacity difference are avoided.

Optionally or additionally, a data disk may be further added to a group of data disks.

1. A capacity of an added data disk is greater than a capacity of an existing smallest capacity disk.

Figure 6:
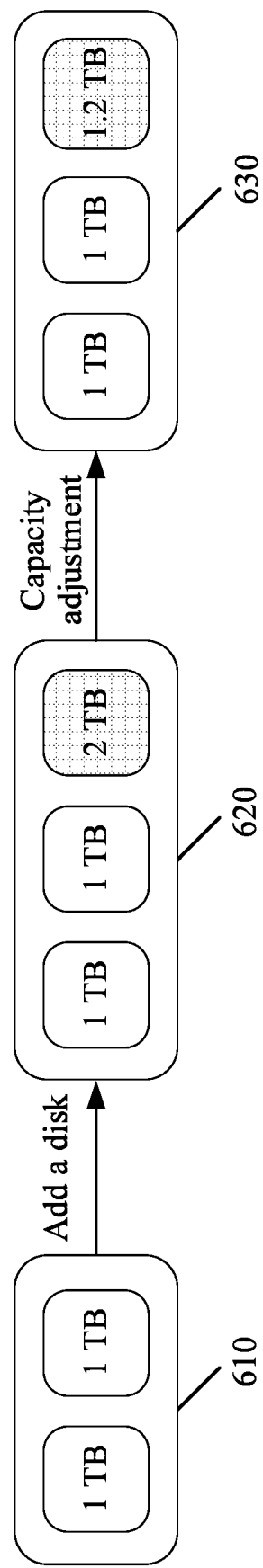
FIG. 6 is a schematic diagram for adjusting an available capacity after a data disk is added according to an embodiment of this application, where after a data disk is added to a group of data disks 610, a group of data disks 620 with the data disk added is obtained, and after available capacities of the data disks 620 are adjusted, a group of data disks 630 is obtained.

FIG. 6 shows an embodiment for adding a data disk. A group of data disks 610 includes two disks whose capacities are both 1 TB. After a data disk whose capacity is 2 TB is added to the data disks 610, a group of data disks 620 is obtained. Because the capacity of the added data disk is 2 TB, the capacity of the added data disk is greater than the capacity of the existing smallest capacity disk. In this case, the capacity of the smallest capacity disk is still 1 TB. Assuming that a capacity difference threshold is set to 20%, an available capacity limit may be calculated: 1 TB*(1+ 20%)=1.2 TB. Because the added data disk definitely meets an adjustment condition, an available capacity of the added data disk is adjusted to 1.2 TB. Data disks 630 obtained after the available capacity is adjusted show an available capacity of each data disk after the group of data disks is adjusted.

2. A capacity of an added data disk is less than or equal to a capacity of an existing smallest capacity disk.

Figure 7:
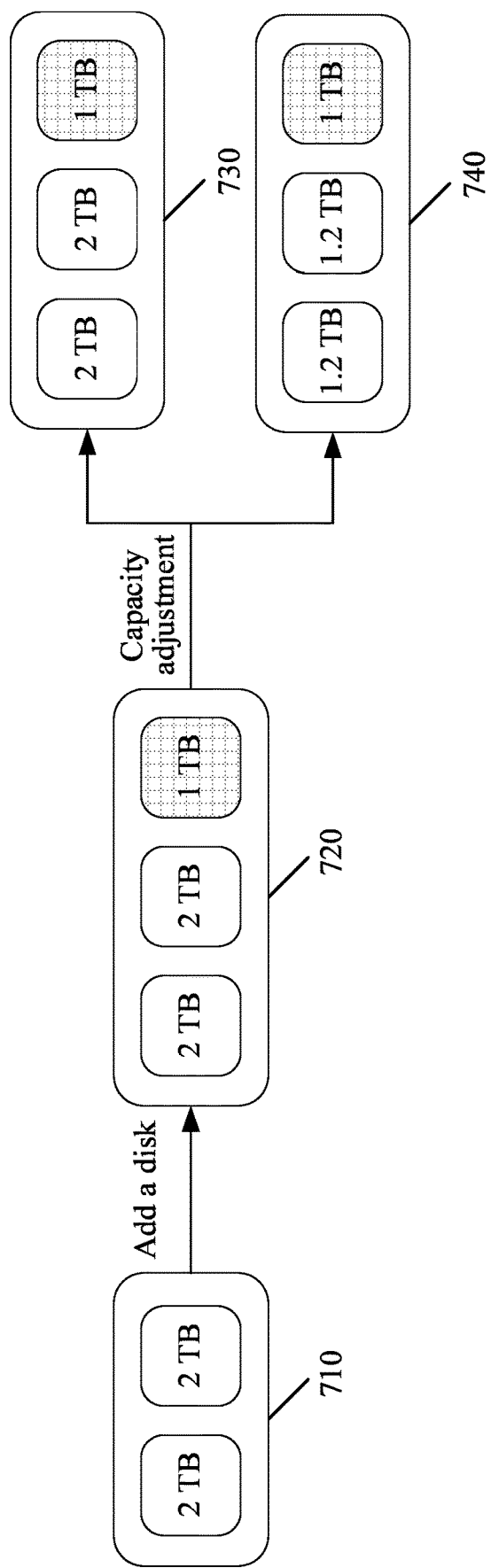
FIG. 7 is a schematic diagram for adjusting an available capacity after a data disk is added according to another embodiment of this application, where after a data disk is added to a group of data disks 710, a group of data disks 720 with the data disk added is obtained, where when available capacities of the original data disks are unadjustable, available capacities of the data disks 720 are not to be adjusted, that is, available capacities of data disks 730 are the same as those of the data disks 720, and when the available capacities of the original data disks are adjustable, a group of data disks 740 is obtained after the available capacities of the data disks 720 are to be adjusted.

FIG. 7 shows an embodiment for adding a data disk. Data disks 710 show available capacities of original data disks in a group of data disks. The group of data disks 710 includes two data disks whose capacities are both 2 TB. Data disks 720 include data disks in the group of data disks after a data disk is added. As shown in the figure, a capacity of the added data disk is 1 TB. The capacity of the added data disk is a smallest capacity among the disks in the group of data disks. When a capacity difference threshold is set to 20%, an available capacity limit may be calculated: 1 TB*(1+20%) =1.2 TB. If storage space of an original 2 TB data disk beyond the limit of 1.2 TB is used, available capacities of the two original 2 TB data disks are not adjusted, so that security of stored data is ensured. Data disks 730 show an available capacity of each data disk in the group of data disks when the available capacities of the original data disks are unadjustable after the data disk is added. If storage space of an original 2 TB data disk beyond the limit of 1.2 TB is unused, the available capacities of the two original 2 TB data disks are adjusted. Data disks 740 show an available capacity of each data disk after the group of data disks is adjusted when the available capacities of the original data disks are adjustable after the data disk is added.

Optionally or additionally, a data disk may be further removed from a group of data disks.

1. Removing a Large Capacity Data Disk

Figure 8:
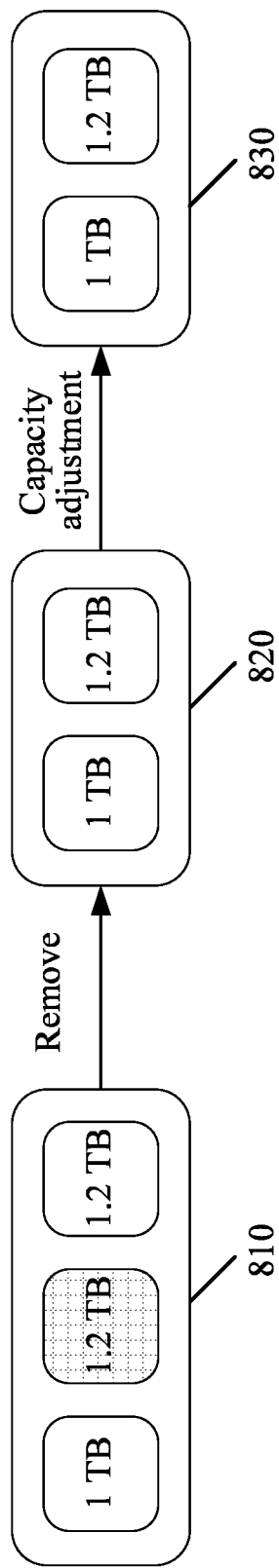
FIG. 8 is a schematic diagram for adjusting an available capacity after a data disk is removed according to an embodiment of this application, where after a data disk is removed from a group of data disks 810, a group of data disks 820 with the data disk removed is obtained, and then data disks 830 with capacities adjusted are obtained after available capacities of the data disks 820 are adjusted.

FIG. 8 shows an embodiment for removing a data disk. Data disks 810 show available capacities of original data disks in a group of data disks. The group of data disks includes one data disk whose available capacity is 1 TB and two data disks whose available capacities are both 1.2 TB. Actual capacities of the two data disks whose available capacities are both 1.2 TB are 2 TB (a process of adjusting an actual capacity of 2 TB to an available capacity of 1.2 TB is omitted herein, and a capacity difference threshold is still set to 20% herein). Data disks 820 include data disks in the group of data disks after one data disk is removed. As shown in the figure, an available capacity of the removed data disk is 1.2 TB. After the data disk is removed, a smallest capacity disk in the group of data disks remains unchanged and is still 1 TB. Therefore, available capacities of other data disks are unchanged. Data disks 830 show an available capacity of each data disk after the group of data disks is adjusted after one data disk is removed.

2. Removing a Smallest Capacity Disk

Figure 9:
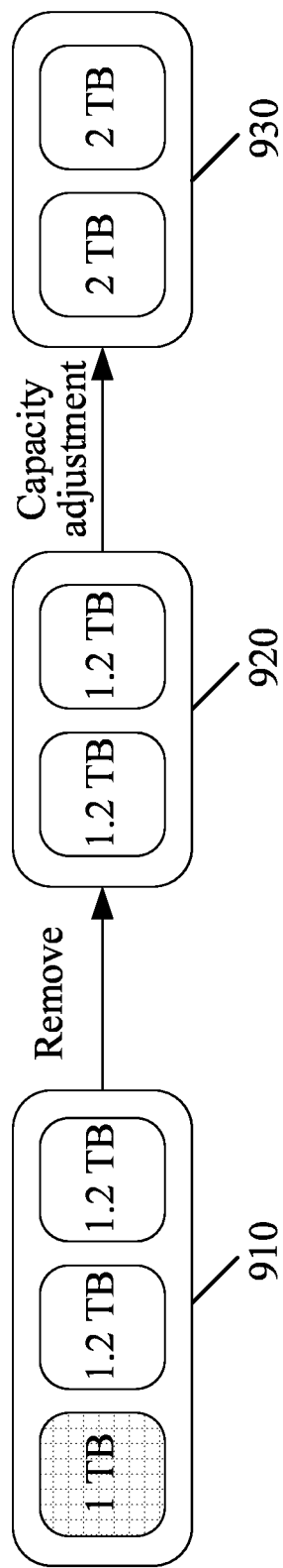
FIG. 9 is a schematic diagram for adjusting an available capacity after a data disk is removed according to another embodiment of this application, where after a data disk is removed from a group of data disks 910, a group of data disks 920 with the data disk removed is obtained, and then data disks 930 with capacities adjusted are obtained after available capacities of the group of data disks 920 are adjusted.

FIG. 9 shows an embodiment for removing a data disk. Data disks 910 show available capacities of original data disks in a group of data disks. The group of data disks includes one data disk whose available capacity is 1 TB and two data disks whose available capacities are both 1.2 TB. Actual capacities of the two data disks whose available capacities are both 1.2 TB are 2 TB (a process of adjusting an actual capacity of 2 TB to an available capacity of 1.2 TB is omitted herein, and a capacity difference threshold is still set to 20% herein). Data disks 920 include data disks in the group of data disks after one data disk is removed. As shown in the figure, an available capacity of the removed data disk is 1 TB. After the data disk is removed, a smallest capacity disk in the group of data disks is changed to a data disk whose actual capacity is 2 TB, that is, the smallest capacity disk herein is changed to 2 TB. When the capacity difference threshold is still set to 20%, a new available capacity limit is: 2 TB*(1+20%)=2.4 TB. An available capacity of the group of capacity disks is adjusted based on the new smallest capacity disk and the new available capacity limit. Data disks 930 show an available capacity of each data disk after the group of data disks is adjusted after one data disk is removed. As can be learned, when the removed data disk is the smallest capacity disk in the group of data disks, the available capacity of the group of data disks may be increased. As shown in this embodiment, after the smallest capacity disk is removed, the available capacity of the group of data disks is increased from previously (1+1.2+1.2) TB=3.4 TB to (2+2) TB=4 TB. Therefore, removing a smallest capacity disk from a group of data disks can be used as a means of capacity expansion.

Optionally or additionally, an available capacity limit of a data disk may be further adjusted by changing a capacity difference threshold.

Figure 10:
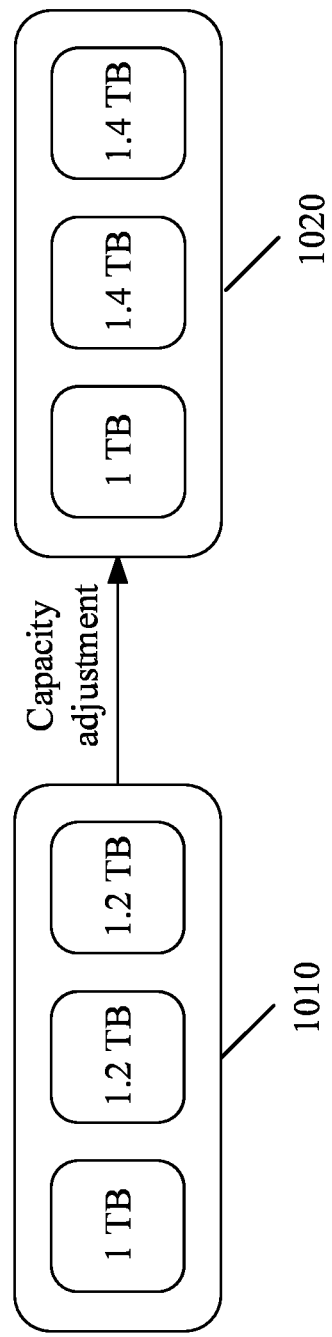
FIG. 10 is a schematic diagram for adjusting an available capacity after a capacity difference threshold is changed according to an embodiment of this application, where available capacities of data disks 1010 are adjusted by adjusting the capacity difference threshold, so that data disks 1020 with capacities adjusted are obtained.

FIG. 10 shows an embodiment for changing a capacity difference threshold. Data disks 1010 show available capacities of original data disks in a group of data disks. The group of data disks includes one data disk whose available capacity is 1 TB and two data disks whose available capacities are both 1.2 TB. Actual capacities of the two data disks whose available capacities are both 1.2 TB are 2 TB (a process of adjusting an actual capacity of 2 TB to an available capacity of 1.2 TB is omitted herein, and a capacity difference threshold is still set to 20% herein). Data disks 1020 show an available capacity of each data disk after the group of data disks is adjusted after the capacity difference threshold is changed. The capacity difference threshold is changed from 20% to 40%. A smallest capacity disk remains unchanged and is still 1 TB. Based on the current 1 TB smallest capacity disk and the capacity difference threshold 40%, a current available capacity limit is calculated: 1 TB*(1+40%)=1.4 TB. Because the current available capacity limit is less than actual capacities 2 TB of both of the two data disks other than the smallest capacity disk, assuming that available capacities of the two data disks may be adjusted, the available capacities are adjusted from previously 1.2 TB to 1.4 TB. The data disks 1020 show the available capacity of each data disk in the group of data disks after the adjustment.

Figure 11:
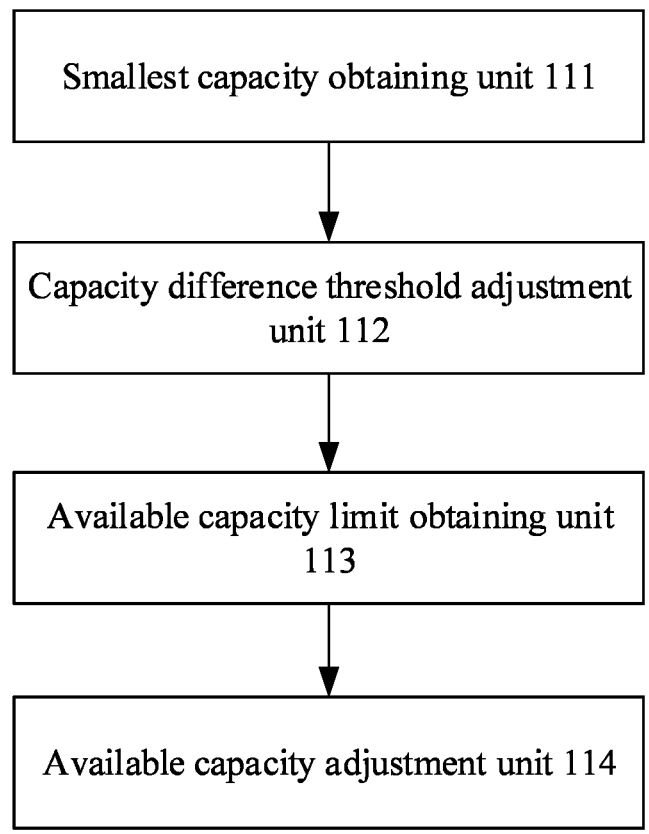
FIG. 11 is a schematic diagram of a data disk capacity management apparatus according to an embodiment of this application.

According to another aspect of this application, an apparatus for managing a data disk capacity is provided. FIG. 11 is a schematic diagram of an apparatus for managing a data disk capacity in this application. The apparatus for managing a data disk capacity includes a smallest capacity obtaining unit 111, a capacity difference threshold adjustment unit 112, an available capacity limit obtaining unit 113, and an available capacity adjustment unit 114.

The smallest capacity obtaining unit 111 is configured to obtain a current capacity of a smallest capacity disk in a group of data disks, and compare the capacity of the current smallest capacity disk with a previously recorded capacity of the smallest capacity disk. If the two are not equal, which indicates that the smallest capacity disk is changed, an adjustment of an available capacity of each data disk in the group of data disks needs to be triggered. If the two are equal, which indicates that the smallest capacity disk is unchanged, there is no need to trigger the adjustment of the available capacity of each data disk in the group of data disks.

The capacity difference threshold adjustment unit 112 is configured to adjust a capacity difference threshold to limit a difference between the capacity of each data disk in the group of data disks and that of the smallest capacity disk. After the capacity difference threshold adjustment unit adjusts the capacity difference threshold, the adjustment of the available capacity of each data disk in the group of data disks is triggered. If the capacity difference threshold adjustment unit does not adjust the capacity difference threshold, the adjustment of the available capacity of each data disk in the group of data disks is not triggered.

The adjustment by the capacity difference threshold adjustment unit may be a manual adjustment or an automatic adjustment. When the adjustment by the capacity difference threshold adjustment unit is a manual adjustment, a user can adjust the capacity difference threshold based on different application scenarios by using the capacity difference threshold adjustment unit. For example, in an environment with heterogeneous data disk capacities, the capacity difference threshold may be set to 0% in an early phase of using the storage system, to ensure that the available capacity of each data disk is consistent, thereby avoiding a load imbalance and improving service performance of the storage system. In a late phase of using the storage system, because the available capacity is nearly exhausted, where no additional data disk is available for capacity expansion, a priority of the available capacity of the system is higher than a priority of performance. In this case, the user can increase the capacity difference threshold to release some previously limited capacities of large capacity disks and increase the available capacity of the storage system. When the adjustment by the capacity difference threshold adjustment unit is an automatic adjustment, a program may be set to adjust the capacity difference threshold based on a current remaining capacity. For example, in the early phase of using the storage system, because the remaining available capacity is large, a value of the capacity difference threshold can be set to a small value. When the remaining available capacity is lower than a level, the capacity difference threshold is increased, so that some limited capacities of the large capacity disks are released to meet storage capacity requirements. When the remaining available capacity is higher than a level, the capacity difference threshold is reduced to release some capacities of the large capacity disks to avoid a load imbalance among the data disks and improve performance of the storage system. A capacity difference between each data disk in the group of storage disks and the smallest capacity disk is dynamically adjusted by setting different capacity difference thresholds in different application scenarios. In this way, it can be ensured that performance of the storage system is improved as much as possible while capacity requirements of the storage system are met.

The available capacity limit obtaining unit 113 is configured to calculate an available capacity limit for each data disk in the group of data disks based on the capacity of the current smallest capacity disk and the capacity difference threshold when the adjustment of the available capacity of the data disk is triggered. The available capacity limit obtaining unit 113 may calculate the available capacity limit based on different types of capacity difference thresholds. If the capacity difference threshold is a percentage, Available capacity limit=Capacity of the smallest capacity disk*(1+ Capacity difference threshold). If the capacity difference threshold is a capacity difference, Available capacity limit=Capacity of the smallest capacity disk+Capacity difference threshold.

The available capacity adjustment unit 114 is configured to adjust an available capacity of a to-be-adjusted data disk based on the available capacity limit. Steps of adjusting the available capacity of each data disk are as follows: obtaining an actual capacity of the to-be-adjusted data disk; determining a magnitude relationship between the available capacity limit and the actual capacity of the to-be-adjusted data disk; and if the available capacity limit is greater than the actual capacity of the to-be-adjusted data disk, determining that the available capacity of the to-be-adjusted data disk is the actual capacity of the to-be-adjusted data disk; or if the available capacity limit is less than or equal to the actual capacity of the to-be-adjusted data disk, determining that the available capacity of the to-be-adjusted data disk is the available capacity limit.

The available capacity adjustment unit 114 may be further configured to calculate a remaining available capacity of each data disk. Related parameters such as usage and status of each data disk may be reflected by using the remaining available capacity. A process of calculating the remaining available capacity is as follows: determining whether the available capacity of the data disk after the adjustment is greater than the available capacity of the data disk before the adjustment; and if the available capacity after the adjustment is greater than the available capacity before the adjustment, determining that a current remaining available capacity of the data disk is a remaining available capacity before the adjustment plus a difference between the available capacity after the adjustment and the available capacity before the adjustment; or if the available capacity after the adjustment is less than the available capacity before the adjustment, determining that a current remaining available capacity of the data disk is a remaining available capacity before the adjustment minus a difference between the available capacity after the adjustment and the available capacity before the adjustment.

To better ensure security of original data in the data disk during the data disk adjustment, the apparatus for managing a data disk capacity according to this application further includes an adjustment condition determining unit. If the to-be-adjusted data disk meets an adjustment condition, the available capacity of the data disk is adjusted. If the to-be-adjusted data disk does not meet the adjustment condition, the available capacity of the data disk is not adjusted. In the adjustment condition determining unit, criteria for determining whether the adjustment condition is met may be as follows: If the actual capacity of the data disk exceeds the available capacity limit and storage space beyond the available capacity limit is used, the available capacity of the data disk is not allowed to be adjusted, so that security of data stored in the data disk is ensured. If storage space of the data disk beyond the available capacity limit is unused, the available capacity of the data disk is allowed to be adjusted. Based on the foregoing adjustment condition determining criteria, other adjustment condition determining criteria may also be added. For example, whether all data disks in the group to which the to-be-adjusted data disk belongs meet an available capacity adjustment condition. The available capacity of the to-be-adjusted data disk is adjusted only when all data disks in the group of data disks meet the available capacity adjustment condition. The added adjustment condition determining unit may determine whether the to-be-adjusted data disk meets the available capacity adjustment condition, and only the available capacity of the data disk meeting the adjustment condition is adjusted. In this way, security of data in the storage system is enhanced, and reliability of the apparatus for managing a data disk capacity in this application is improved.

The apparatus for managing a data disk capacity according to this application has the following advantages: (1) The smallest capacity obtaining unit and the capacity difference threshold adjustment unit can detect in real time whether the smallest capacity disk and the capacity difference threshold of the group of data disks are changed. If the smallest capacity disk or the capacity difference threshold is changed, the available capacity adjustment unit automatically adjusts an available capacity of the group of data disks based on the current capacity value of the smallest capacity disk and the capacity difference threshold, so that an available capacity difference of each data disk in the group of data disks is within a specified range, thereby avoiding a load imbalance caused by an excessively large capacity difference. In addition, because the adjustment can be automatically performed, flexibility is high. (2) The capacity difference threshold adjustment unit can adjust the capacity difference threshold based on different application scenarios and a status of the system. The storage system can automatically adjust the available capacity of the data disk based on the adjusted capacity difference threshold to adapt to different performance-first and capacity-first scenarios and ensure optimal performance of the storage system while meeting a capacity requirement.

This application further provides an electronic device, including a memory and a processor, where
- the memory is configured to store program code to be used during running of the electronic device; and
- the processor is configured to execute the program code to implement the foregoing method for adaptively managing a data disk capacity.

This application further provides a storage medium. When instructions in the storage medium are executed by a processor of an electronic device, the electronic device is enabled to perform the foregoing method for adaptively managing a data disk capacity.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the electronic device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing electronic device to generate a machine, so that the instructions executed by the computer or the processor of any other programmable data processing electronic device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing electronic device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or any other programmable data processing electronic device, so that a series of operations and steps are performed on the computer or the other programmable electronic device, to generate computer-implemented processing. Therefore, the instructions executed on the computer or the other programmable electronic device provide steps for implementing a specific function in one or more processes in the flowcharts and/or in one or more blocks in the block diagrams.

Apparently, a person skilled in the art can make various changes and variations to this application without departing from the spirit and scope of this application. Therefore, this application is also intended to cover the changes and variations provided that the changes and variations of this application fall within the scope of the claims of this application or equivalent technologies thereof.

What is claimed is:

1. A method for adaptively managing a data disk capacity, comprising:
    when at least one of a capacity difference threshold of a first group of data disks and a capacity of a smallest capacity disk is changed, obtaining a current capacity difference threshold of the first group of data disks and a capacity of a current smallest capacity disk, wherein the smallest capacity disk is one data disk in the first group of data disks;
    calculating an available capacity limit based on the current capacity difference threshold of the first group of data disks and the capacity of the current smallest capacity disk; and
    adjusting an available capacity of a to-be-adjusted data disk in the first group of data disks based on the available capacity limit, so that an available capacity of the adjusted data disk is less than or equal to the available capacity limit.

2. The method according to claim 1, wherein the adjusting the available capacity of the to-be-adjusted data disk in the first group of data disks based on the available capacity limit comprises:
    obtaining an actual capacity of the to-be-adjusted data disk; and
    determining a magnitude relationship between the available capacity limit and the actual capacity of the to-be-adjusted data disk, and in a case that the available capacity limit is less than the actual capacity of the to-be-adjusted data disk, adjusting the available capacity of the to-be-adjusted data disk to the available capacity limit.

3. The method according to claim 2, wherein before the at least one of the capacity difference threshold of the first group of data disks and the capacity of the smallest capacity disk is changed, the method further comprises:
    increasing the capacity difference threshold in response to a total available capacity of the first group of data disks being less than or equal to a first capacity threshold.

4. The method according to claim 2, wherein before the at least one of the capacity difference threshold of the first group of data disks and the capacity of the smallest capacity disk is changed, the method further comprises:
    reducing the capacity difference threshold in response to a total available capacity of the first group of data disks being greater than or equal to a second capacity threshold.

5. The method according to claim 2, wherein the determining the magnitude relationship between the available capacity limit and the actual capacity of the to-be-adjusted data disk further comprises:
    in a case that the available capacity limit is greater than or equal to the actual capacity of the to-be-adjusted data disk, adjusting the available capacity of the to-be-adjusted data disk to the actual capacity of the to-be-adjusted data disk.

6. The method according to claim 1, wherein the capacity difference threshold comprises a first capacity difference threshold and a second capacity difference threshold, a type of the to-be-adjusted data disk comprises a first data disk type and a second data disk type, and the available capacity limit comprises a first available capacity limit and a second available capacity limit, wherein the second capacity difference threshold is greater than the first capacity difference threshold; and the calculating an available capacity limit based on the current capacity difference threshold and the capacity of the current smallest capacity disk, and adjusting an available capacity of a to-be-adjusted data disk based on the available capacity limit, so that an available capacity of the adjusted data disk is less than or equal to the available capacity limit comprises:

calculating the first available capacity limit based on the current first capacity difference threshold and the capacity of the current smallest capacity disk;

adjusting the available capacity of the to-be-adjusted data disk of the first data disk type based on the first available capacity limit, so that the available capacity of the adjusted data disk of the first data disk type is less than or equal to the first available capacity limit;

calculating the second available capacity limit based on the current second capacity difference threshold and the capacity of the current smallest capacity disk; and adjusting the available capacity of the to-be-adjusted data disk of the second data disk type based on the second available capacity limit, so that the available capacity of the adjusted data disk of the second data disk type is less than or equal to the second available capacity limit.

7. The method according to claim 1, wherein before the adjusting the available capacity of the to-be-adjusted data disk in the first group of data disks based on the available capacity limit, the method further comprises:

determining whether the to-be-adjusted data disk meets an available capacity adjustment condition, and in a case that the to-be-adjusted data disk meets the available capacity adjustment condition, allowing adjusting the available capacity of the to-be-adjusted data disk.

8. The method according to claim 7, wherein the available capacity adjustment condition comprises that:

an actual capacity of the to-be-adjusted data disk is greater than the available capacity limit, and storage space of the actual capacity of the to-be-adjusted data disk beyond the available capacity limit is unused.

9. The method according to claim 1, wherein the method further comprises:

outputting at least one of a remaining available capacity, usage, and a data disk status of the adjusted data disk.

10. The method according to claim 1, wherein the method further comprises:

determining whether the available capacity of the adjusted data disk is greater than the available capacity of the to-be-adjusted data disk, and in a case that the available capacity of the adjusted data disk is greater than the available capacity of the to-be-adjusted data disk, a remaining available capacity of the adjusted data disk is a remaining available capacity of the to-be-adjusted data disk plus a difference between the available capacity of the adjusted data disk and the available capacity of the to-be-adjusted data disk.

11. The method according to claim 10, wherein the determining whether the available capacity of the adjusted data disk is greater than the available capacity of the to-be-adjusted data disk further comprises:

in a case that the available capacity of the adjusted data disk is less than the available capacity of the to-be-adjusted data disk, the remaining available capacity of the adjusted data disk is the remaining available capacity of the to-be-adjusted data disk minus the difference between the available capacity of the adjusted data disk and the available capacity of the to-be-adjusted data disk.

12. The method according to claim 1, wherein a type of the capacity difference threshold comprises a percentage, a capacity difference, and a weight.

13. The method according to claim 12, wherein when the capacity difference threshold is a percentage, Available capacity limit=Capacity of the smallest capacity disk*(1+ Capacity difference threshold); and when the capacity difference threshold is a capacity difference, Available capacity limit=Capacity of the smallest capacity disk+Capacity difference threshold.

14. The method according to claim 1, wherein each data disk in the first group of data disks is provided with storage space as hot spare space.

15. The method according to claim 1, wherein the first group of data disks refers to all data disks in a storage pool, all data disks in a node of a storage pool, or all data disks at a performance tier in a node of a storage pool.

16. An electronic device, comprising a memory and a processor, wherein the memory is configured to store program code to be used during running of the electronic device; and the processor is configured to execute the program code to implement the method according to claim 1.

17. A non-volatile storage medium, wherein when instructions in the storage medium are executed by a processor, the processor is enabled to perform the method according to claim 1.

* * * * *